Figure 3:
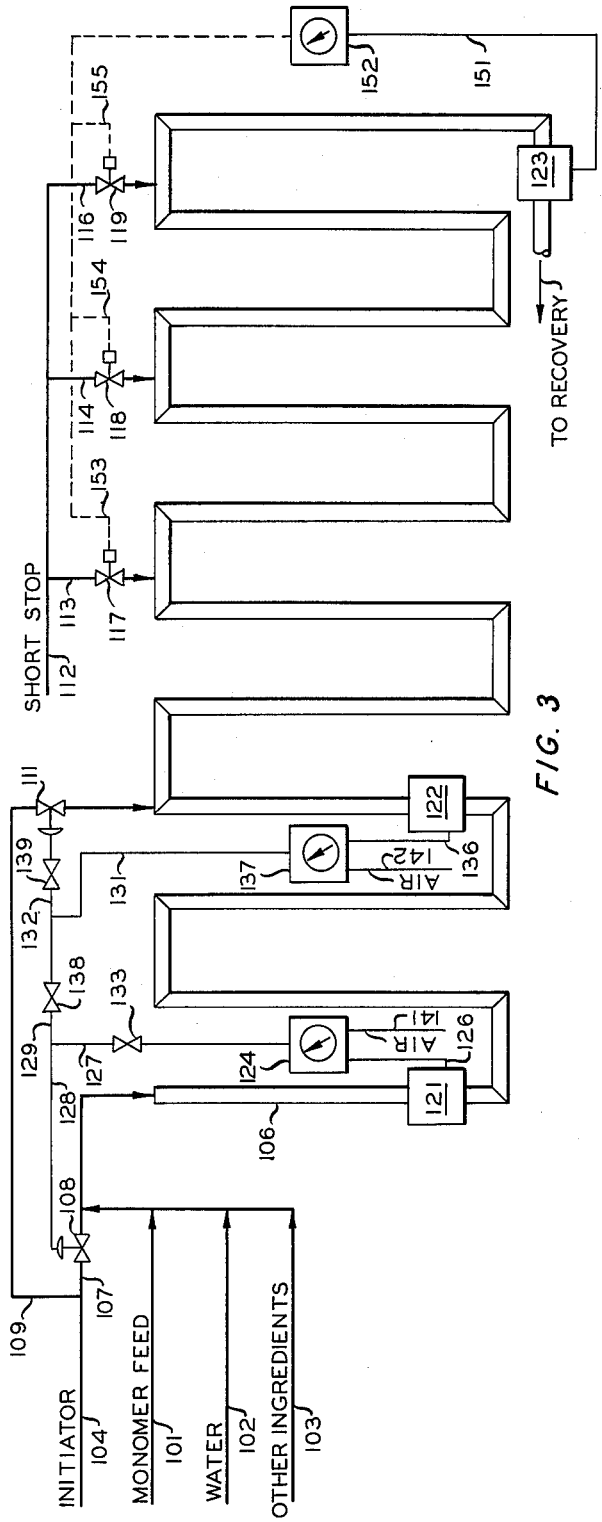

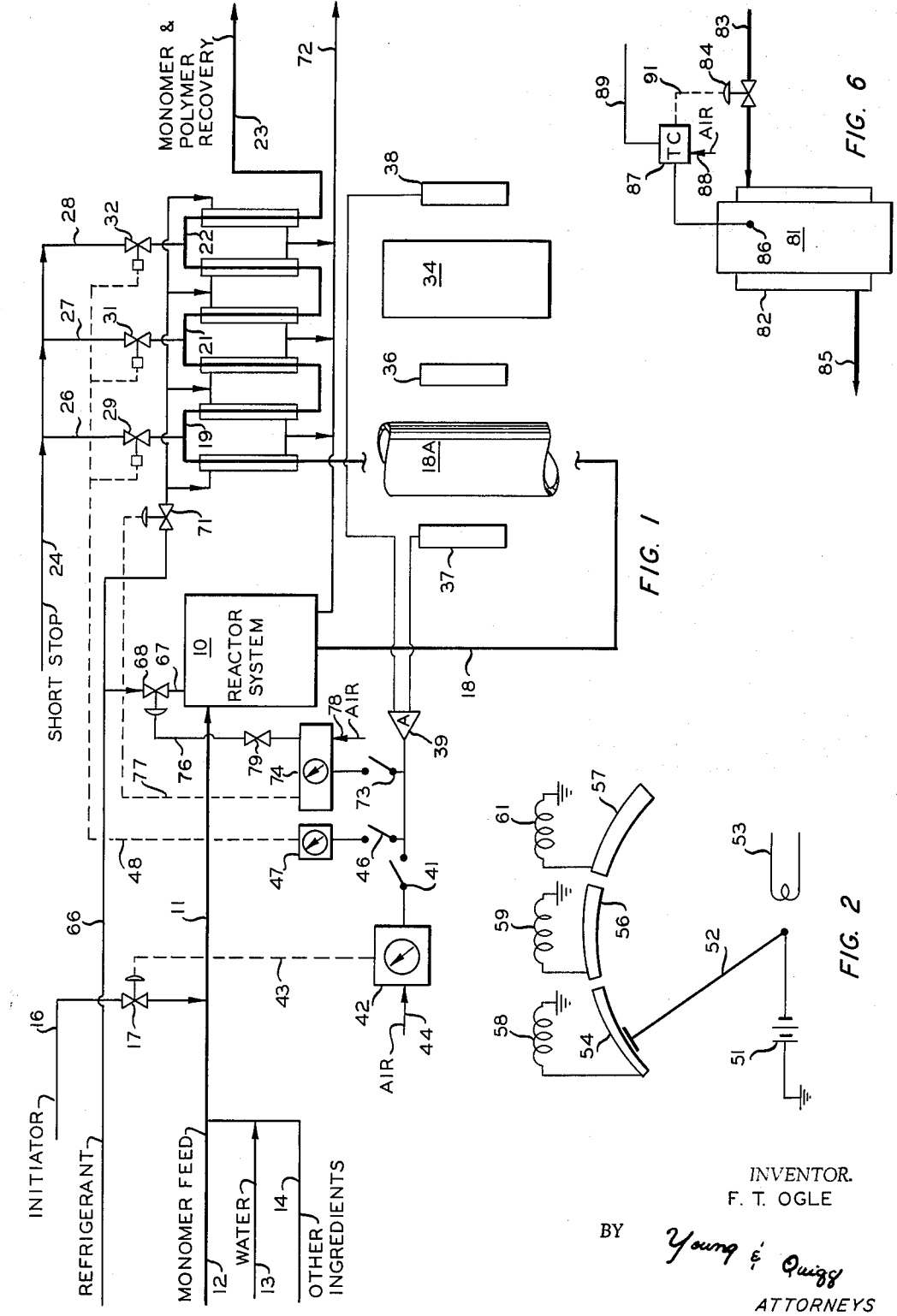

June 7, 1966  F. T. OGLE  3,254,965
POLYMERIZATION CONTROL APPARATUS
Original Filed Nov. 28, 1958  2 Sheets-Sheet 2

INVENTOR.
F. T. OGLE
BY *Young & Quigg*
ATTORNEYS

United States Patent Office 3,254,965
Patented June 7, 1966

3,254,965
POLYMERIZATION CONTROL APPARATUS
Frank T. Ogle, Bartlesville, Okla., assignor to Phillips Petroleum Company, a corporation of Delaware
Original application Nov. 28, 1958, Ser. No. 776,839, now Patent No. 3,174,953, dated Mar. 23, 1965. Divided and this application Dec. 4, 1964, Ser. No. 416,069
4 Claims. (Cl. 23—285)

This is a division of application Serial No. 776,839, filed November 28, 1958 and now Patent No. 3,174,953.

This invention relates to a continuous polymerization control system.

In the polymerization of unsaturated monomers to form high molecular weight polymers, various control methods are used. In one system, tests are made upon the finished product and this provides basis for changing the recipe or the monomer ratio to obtain a product within desired specifications. The present invention relates to a control system which gives a continuous measure of the degree of polymerization and which utilizes this measurement for continuous control of factors which influence the degree of polymerization. In one aspect, this invention relates to the providing of a controlled density so that the density is determined and utilized so as to control at least one variable of the polymerization process responsive to indications of change in said density.

As is well known in the art of emulsion polymerization, to which my invention pertains, polymerization is initiated by the addition of an initiator and polymerization is stopped by the addition of a shortstop agent. In the production of synthetic rubber by copolymerizing butadiene and styrene, normal operation is to add a specific amount of initiator at the beginning of the polymerization and to add an additional quantity of initiator, generally referred to as a booster, if polymerization does not proceed at the proper rate. Most polymerizations of this type are carried to approximately 60 percent momomer conversion. Polymerization is stopped at the desired point by the addition of the shortstop agent. Generally, at least the final reactor is a long tube, and provision is made for addition of the shortstop at one of a multiplicity of points along this tube. This tube is referred to as a displacement zone. Another variable is the polymerization temperature, the polymerization rate approximately doubling for each 18° F. (10° C.) increase in the useful range of −30° F. to 150° F.

It is also known that the density of latex produced by emulsion polymerization varies according to the degree of polymerization. More particularly, in the production of rubbery butadiene/styrene copolymers, the density of the polymer is different from water and the mixture of monomers.

The following are objects of my invention.

An object of my invention is to provide a continuous polymerization control system. A further object of my invention is to provide a continuous polymerization control system wherein the density of the polymerization mixture is determined and wherein this determination is used to control factors controlling polymerization such as temperature and the ingredients starting and stopping polymerization. A further object of the invention is to provide continuous measurement of conversion in order to provide improved reactor operation, increased throughput, and improved product quality.

Figure 5:
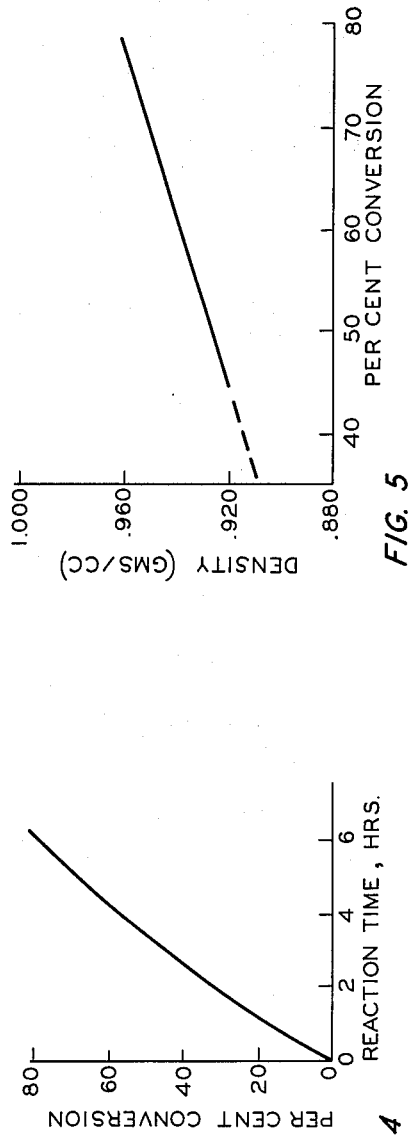
Figure 4:
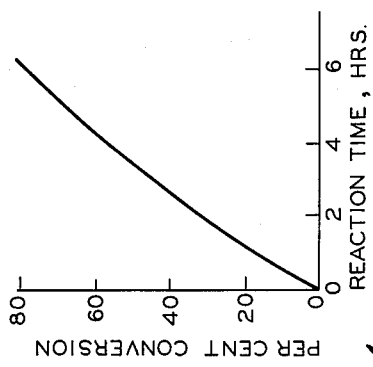

Other objects of this invention will be apparent to one skilled in the art upon reading the specification, which includes a drawing comprising FIGURE 1, a schematic drawing of one embodiment of my invention;

FIGURE 2, an electrical control system for adjusting valve operation;

FIGURE 3, a schematic drawing of a modification of the system of FIGURE 1;

FIGURE 4, a curve showing the relationship between percent conversion and reaction time for a particular reaction system;

FIGURE 5, a curve showing the relationship between latex density and percent conversion; and FIGURE 6, a schematic drawing showing in more detail a portion of the control system of FIGURE 1.

This invention relates to an improvement in the continuous production of polymers by polymerization of unsaturated monomers in aqueous emulsion in a polymerization zone which comprises maintaining substantially constant conversion by continuously determining changes in the density of the polymerization mixture and controlling a process variable in response to the change in said density.

Thus the invention resides in an improvement in an emulsion polymerization system, said improvement comprising maintaining substantially constant conversion by determining changes in the density of the polymerization mixture, and controlling polymerization temperature or supply either of the initiator or the shortstop agent, or both of these ingredients, in proportion to changes in the density of the polymerization mixture. The invention is applicable to polymerization in aqueous emulsion wherein the density of the polymer produced is different from water and different from the density of the monomers. The greatest field of polymerization of such monomers is in the field of the production of polymers of conjugated dienes containing up to 8 carbon atoms and in the production of copolymers of these dienes with copolymerizable monoolefins. Suitable dienes include 1,3-butadiene, isoprene, 2,3-dimethyl 1,3-pentadiene and 1,3-octadiene. Specific copolymers to which the present invention is applicable include those of styrene and butadiene, 2-methyl-5-vinylpyridine and butadiene, and terpolymers such as polymers of 2-methyl-5-vinylpyridine, acrylonitrile and butadiene. This list will suggest to those skilled in the art many other monomers to which the present invention is applicable. The particular polymers are not new, these being known in the prior art for many years. Likewise, a large variety of polymerization systems are suitable and the present invention does not depend upon any particular emulsion polymerization recipe, the examples herein showing different recipes. For further details concerning emulsion polymerization, attention is directed to "Synthetic Rubber," by Whitby, copyright 1954, by John Wiley and Sons, Chapter 8 of this book being directed to emulsion polymerization.

The invention is specifically set forth in the drawings, and attention is now directed thereto. FIGURE 1 illustrates schematically my invention as it would be applied to a polymerization system using a series of large reactors such as that described by Larson in Chemical Engineering Progress, volume 47, No. 5, May 1951, pages 270–274. The reactor system 10 of FIGURE 1 corresponds to the series of reactors disclosed by Larson. The various ingredients are supplied to reactor 10 through conduit 11, these including the monomer feed conduit 12, water supply conduit 13, a conduit 14 supplying the other ingredients for the polymerization, and conduit 16 provided with valve 17 supplying the initiator. From the last reactor, the polymerization mixture is fed by conduit 18 to a displacement reactor, this comprising an elongated zone having loops 19, 21 and 22. Conduit 23 supplies the mixture to the monomer and polymer recovery apparatus (not shown). Obviously the displacement zone can be one long tube or as shown and can comprise many more loops than are shown. Shortstop supply line 24 is provided with conduits 26, 27 and 28 communicating with separate points within the displacement zone. Conduits 26, 27 and 28 are provided with valves 29, 31 and 32, respectively.

In prior operation, the product in line 23 has been tested for conversion and the point of introduction of the shortstop agent manually adjusted to provide shortstop addition at the proper point in the displacement zone. My invention provides continuous automatic control of the shortstop addition. Obviously, different density control systems are available. One which is particularly suitable is the Ohmart density gauge. Such density gauges use Ohmart cells which are commercially available and which are described in "Industrial Applications of Ohmart Cells" by P. E. Ohmart and H. L. Cook, Jr. The operation of these cells is described in the Journal of Applied Physics, vol. 22, 1504–5 (1951).

FIGURE 1 includes a schematic drawing of such a system. A portion, 18A, of conduit 18 is shown in enlarged section. Positioned closely thereto is a reference tube 34. Between these tubes is placed a radioactive source cell 36. Detecting cells 37 and 38 are placed adjacent members 18A and 34, these producing a current proportional to the amount of radiation transmitted through the conducting material. The output from each of these cells is connected to amplifier 39. The detecting cells are generally arranged so that the currents produced buck each other and, therefore, the output from amplifier 39 is 0 when the density in 18A corresponds to that desired, i.e. that equal to that in reference cell 34. By means of switch 41 the output from amplifier A can be fed to recorder controller 42. The output from recorder controller 42 is connected to valve 17 by means of conduit 43, this valve being pneumatically operated by means of air supplied by conduit 44.

By means of switch 46, the output of amplifier 39 can be fed to recorder controller 47. By means of line 48, recorder controller 47 individually opens one of valves 29, 31 and 32.

FIGURE 2 illustrates in detail a type of control system suitable for use in recorder controller 47. Electrically operated solenoid valves are preferably used in the shortstop control system. In FIGURE 2 a galvanometer type instrument is used, the power from a source 51 being supplied to arm 52, this arm being moved by means such as a coil 53 or a motor responsive to the output of amplifier 39. Arm 52 contacts the segments at 54, 56 and 57 which are in turn connected to coils 58, 59 and 61 which operate valves 29, 31 and 32, respectively. Valves 29, 31 and 32 are of the type which are open when energized. Thus, when the conversion, and consequently emulsion density, are high, the current from amplifier 39 indicates that shortstop should be added to upstream loop 19 and current flows through coil 58 to open valve 29. When the conversion decreases, arm 52 moves to open a valve further downstream to permit slightly greater conversion before addition of the shortstop. Only one valve is open at any one time.

Generally, satisfactory control is obtained when the system is used to regulate either the initiator or the shortstop addition. However, in some instances, both switches 41 and 46 are closed and control is maintained by adjusting both the amount of initiator supplied and the point of addition of the shortstop.

Finally, referring again to FIGURE 1, a temperature control system is provided. The vessels in the reaction system 10 and the displacement zone are provided with a heat exchange system. Refrigerant, supplied by conduit 66, is passed to reactor system 10 by conduit 67 having valve 68 therein and to the displacement zone heat exchange jackets by conduit 66 having valve 71 therein. Conduit 72 is the refrigerant effluent conduit. By means of switch 73, the output of amplifier 39 can be fed to recorder controller 74. The output from recorder controller 74 is connected to valves 68 and 71 by means of conduits 76 and 77 respectively, these valves being pneumatically operated by means of air supplied by conduit 78. Valve 79 is provided in line 76 and this valve, when closed, limits the temperature control to control of the displacement zone.

The temperature control system of each reactor is more fully shown in FIGURE 6 wherein there is shown a reactor 81 provided with a heat exchange jacket 82. The refrigerant is supplied by conduit 83, having valve 84 therein, and removed by conduit 85. Usual temperature control is provided by sensing bulb 86 operatively connected to temperature recorder controller 87. The output from controller 87 is connected to valve 84 by means of conduit 91, this valve being pneumatically operated by means of air supplied by conduit 88. In this figure conduit 89 corresponds to conduit 76 of FIGURE 1, and the output from the density sensing means serves as an overriding control.

Using the temperature control system, the polymerization reactors are set to operate at a predetermined temperature (generally 41° F. for the so-called "cold" rubber and 122° F. for "hot" rubber). When a change in another variable occurs, a change in conversion and consequently emulsion density results. More specifically, lower conversion would give lower emulsion density, and the apparatus adjusts for this by increasing the reactor temperature until the desired conversion is again obtained. Generally valve 79 is closed and the temperature is varied only in the displacement zone. This gives closer control and reduces time lag in the system.

FIGURE 3 illustrates a modification of the system of FIGURE 1 although the system is substantially the same. In this figure the invention is shown as applied to continuous tube polymerization. Tube polymerization is polymerization in which the monomers are polymerized in substantially continuous flow without mixing through a polymerization zone which is quite long with respect to cross section area. Such a system is disclosed in U.S. Patent 2,259,180, granted October 14, 1941, to Schoenfeld et al. In this figure the monomer is supplied by conduit 101, the water by conduit 102, other polymerization ingredients by 103, and the initiator by conduit 104 to a tube polymerization zone 106. For polymerization in this system the faster polymerization recipes are used and there is considerable length between the beginning and end of the polymerization zone, the showing in FIGURE 3 being somewhat abbreviated. As shown, the initiator can be supplied at the beginning of the polymerization zone by means of conduit 107, this supply being controlled by valve 108, or to a downstream point in the polymerization zone by means of conduit 109 provided with valve 111. Shortstop is supplied to the end of the polymerization zone by means of conduit 112 and conduits 113, 114 and 116, these latter conduits being provided with valves 117, 118 and 119. Control of the polymerization is provided by density sensing means 121, 122 and 123. Density sensing means 121 is placed a short distance along polymerization zone 106 and serves to measure the degree of polymerization shortly after it has started. Density sensing means 122 is located further downstream and measures density after polymerization is well under way. Sensing means 123 measures the density following the polymerization zone and immediately prior to further treatment of the polymerization mixture. Density sensing means 121 is connected to recorder controller 124 by means of line 126, extending from recorder controller 124. Conduit 127, having manually operated valve 133 therein, extends to conduit 128 which is, in turn, connected to pneumatic valve 108. Conduit 136 extends from density sensing means 122 to recorder controller 137. From recorder controller 137, conduit 131 extends to conduit 129 having valve 138 therein and conduit 132 having manually operated valve 139 therein.

Conduit 129 connects with conduit 128 and with conduit 132 which is connected to pneumatic valve 111. Recorder controllers 124 and 137 are provided with air supply lines 141 and 142, respectively.

Density sensing means 123 is connected by means of line 151 to recorder controller 152. Recorder controller 152 is operatively connected to valves 117, 118 and 119 by means of lines 153, 154 and 155.

From this description of FIGURE 3, various methods of operation are possible. First, the amount and point of introduction of initiator can be controlled. Frequently, operation is carried out by adding all of the initiator at the beginning of the polymerization. However, it is sometimes desirable to add a small additional amount after polymerization has started. Density sensing means 121 gives a measure of polymerization shortly after it has started and density sensing means 122 gives this same information at a later point in the process. By the method shown, control of the initiator can be controlled by either the determination of 121 or 122. If 121 is to provide all of the control, valve 133 is opened, valve 138 is closed, and valve 139 is closed. The recorder controller 124 controls the total amount of initiator. If recorder controller 137 is to serve as the only control, valve 133 is closed, valve 139 is closed and valve 138 is open. In still another method of operation, both density measurements can be used. In this case valve 133 is open, 138 is closed and 139 is open. In this method of operation recorder controller 124 controls the amount of the initial initiator introduction and controller 137 controls the booster charge.

In addition to initiator control, a system is also provided to control shortstop addition. This is done by the use of recorder controller 152 which is connected to sensing means 123. The operation of shortstop addition is the same as that described in connection with the displacement zone of FIGURE 1. The temperature control system of FIGURE 1 can also be adapted to the polymerization system of FIGURE 3.

In FIGURE 4, a curve is shown illustrating the relationship between the percent conversion and time in the production of synthetic rubber by the following polymerization recipe at 41° F.

| | Parts by weight |
|---|---|
| Butadiene | 72.5 |
| Styrene | 27.5 |
| Water | 215 |
| Potassium fatty acid soap | 5.7 |
| Potassium chloride | 0.4 |
| Sodium salt of a naphthalene sulfonic acid condensed with formaldehyde | 0.2 |
| Tetrasodium salt of ethylenediamine tetraacetic acid | 0.055 |
| Ferrous sulfate heptahydrate | 0.02 |
| Sodium formaldehyde sulfoxylate | 0.05 |
| p-Menthane hydroperoxide | 0.06 |

FIGURE 5 is a curve showing the relationship between the density of unstripped butadiene/styrene latex at various conversion levels. The densities in this figure were determined at 25° C.

The following examples further illustrate my invention, although obviously the particular figures, times, etc. should not be considered as unduly limiting.

*Example I*

Using the butadiene/styrene recipe set forth above, a synthetic rubber latex is produced in the apparatus of FIGURE 1. For the product desired, it is determined that approximately 77 percent conversion is required. From this conversion it can be seen from FIGURE 4 that a reaction time of approximately 6 hours is required and that the density of the product will be approximately 0.956. The flow through the reactor chain is adjusted to provide this residence time by the time that the polymerization mixture has reached the displacement zone. Correspondingly, the density in zone 18A of conduit 18 will be very slightly below this figure. A corresponding reference is used in zone 34 and the apparatus set to add shortstop through conduit 27. If polymerization is faster, the density in zone 18A will increase and recorder controller 47 will close valve 31 in line 27 and open valve 29 in conduit 26. In this manner, the shortstop will be added sooner and the ultimate conversion can be maintained constant. In like manner, the addition of initiator can be varied in amount.

*Example II*

A rubbery copolymer of butadiene and styrene is prepared by emulsion polymerization using the apparatus shown in FIGURE 3. This polymerization is carried out using the following recipe:

| | Parts by weight |
|---|---|
| Water | 300 |
| 1,3-butadiene | 78 |
| Styrene | 22 |
| Lauric acid | 5.00 |
| Disproportionated rosin acid | 16.00 |
| KOH | 1.50 |
| KCl | 0.30 |
| Sodium salt of condensed aryl-sulfonic acid | 0.15 |
| Tetrasodium salt of ethylenediamine tetraacetic acid | 0.15 |
| $Na_2SiO_3$ } Activator | 1.11 |
| $FeSO_4 \cdot 7H_2O$ } | 1.11 |
| Phenylcyclohexane hydroperoxide (catalyst) | 0.61 |
| Tert-$C_{12}$ mercaptan (modifier) | 0.05 |
| Shortstop: sodium dimethyl dithiocarbamate | 0.25 |

In this operation, all figures being given on a per hour basis, 1170 pounds of butadiene and 380 pounds of styrene are supplied by conduit 101. The water, amounting to 3825 pounds, is supplied by conduit 102. By means of conduit 103, 0.75 pound of mercaptan, 22.5 pounds of potassium hydroxide, 4.5 pounds of potassium chloride, 2.25 pounds of the sodium salt of ethylenediamine tetraacetic acid, 75 pounds of lauric acid, 240 pounds of disproportionated rosin acid, and 2.25 pounds of the sodium salt of condensed arylsulfonic acid are introduced. The initiator comprises 16.65 pounds of sodium silicate, 16.65 pounds of ferrous sulfate heptahydrate, 9.15 pounds of phenylcyclohexane hydroperoxide and 675 pounds of water. The initiator mixture is supplied at a distance of 75 feet downstream from the point at which the rest of the materials are added, this distance being necessary so that complete emulsification of the monomers can be obtained prior to addition of the initiator. Polymerization is carried out at 48° F. At this temperature a conversion of 80 percent is obtained in 13.8 minutes. The mass flow rate of the material following addition of the initiator is 6389.7 pounds per hour and the specific gravity is 0.92. In order to maintain suitable turbulence, thus providing for a high coefficient of heat transfer, a velocity of about 5 feet per second is used in the reaction zone, this being a 1-inch nominal size pipe. The length of the polymerization zone for 80 percent conversion is 4150 feet.

To shortstop the reaction, 187.5 pounds per hour of a 2 percent by weight aqueous solution of sodium dimethyl dithiocarbamate is added to the polymerization mixture.

As is evident from FIGURE 3, the control of polymerization is provided by recorder controllers 124, 137 and 152. Normally it is not necessary to add a booster, and 124 can be used to control the reaction. If, due to some change in the system such as a change in monomer purity, the rate of initial polymerization changes, this change is sensed by sensing means 121 and recorder controller 124 adjusts valve 108 accordingly. Similarly, the density of the effluent is determined by sensing means 123 and recorder controller 152 adjusts the point of shortstop addition to maintain the desired 80 percent conversion. Normally, it is only necessary to use control of either the initiator or the shortstop.

Example III

Using the recipe of Example I, polymerization is carried out maintaining the initiator and shortstop addition constant. The system is set to operate at 41° F. Because of some change the conversion begins to go above the desired 60 percent. When this change is observed by the control system, controller 74 functions to increase the flow of refrigerant and the temperature is decreased to about 39° F. to bring the conversion back to the desired level. Conversely, when the conversion drops below that desired, the temperature is increased by reducing refrigerant flow.

It is known that a uniform polymerization temperature is desired to obtain a product with uniform properties. However, sufficiently uniform products are obtained by the method of this example using a temperature variation of 5° F. either side of the desired value.

As many possible embodiments can be made of this invention without departing from the scope thereof, it is to be understood that all matter herein set forth is to be interpreted as illustrative and not as unduly limiting the invention.

I claim:

1. Apparatus for obtaining a constant conversion in a polymerization system which comprises in combination a series of polymerization reactors, means to supply feed materials to said reactors, means to remove desired product from the last of said series of reactors, heat exchange means in communication with each of said reactors, density sensing means operatively associated with at least one of said reactors in series to provide a signal representative of the density of the polymerizate within at least one said reactor, control means adapted to receive said signal representative of the density of said polymerizate and actuate control means operatively connected to at least one of said means to supply feed materials and said heat exchange means so as to regulate at least one of said means responsive to said signal from said density sensing means.

2. Apparatus of claim 1 wherein said means to supply feed materials to said reactor is provided with means to control initiator addition to said reactors responsive to said signal from said density sensing means.

3. Apparatus of claim 1 wherein said means to supply feed materials to said reactor is provided with means to control shortstop addition to said reactors responsive to said signal from said density sensing means.

4. The apparatus of claim 2 wherein said heat exchange means in communication with each of said reactors is so adapted as to control the polymerization temperature responsive to said signal from said density sensing means.

References Cited by the Examiner

UNITED STATES PATENTS

| | | | |
|---|---|---|---|
| 2,665,197 | 1/1954 | Rowland | 23—285 |
| 2,886,616 | 5/1959 | Mertz et al. | 23—253 X |
| 2,897,247 | 7/1959 | Marak | 23—253 X |

MORRIS O. WOLK, *Primary Examiner.*

JAMES H. TAYMAN, JR., *Examiner.*